May 4, 1937.    N. JAPOLSKY    2,079,253
ELECTRIC DISTANT CONTROL SYSTEM
Filed Jan. 3, 1936    2 Sheets-Sheet 1

Inventor
Nicholas Japolsky
By Bennie Davis Maxim-Edmonds
Attorneys

Patented May 4, 1937

2,079,253

UNITED STATES PATENT OFFICE 2,079,253

ELECTRIC DISTANT CONTROL SYSTEM

Nicholas Japolsky, Highgate, London, England

Application January 3, 1936, Serial No. 57,331
In Great Britain November 6, 1934

7 Claims. (Cl. 172—239)

This invention relates to electric distant control systems in which a receiver repeats the movements of the transmitter electrically. The invention is more particularly concerned with transmitters of the kind comprising a commutator the brushes of which are supplied with direct current, and an armature having a set of connections (either fixed on the armature or moving relatively to it by means of commutator brushes) from which the output current is supplied either directly to the receiver or to a power amplifier (e. g., a commutator generator) connected to a receiver, so that the relative movement of the input brushes with respect to the output brushes or to said connections, determines the position of the magnetic field in the transmitter in relation to said connections which position determines the position of the receiver. Usually only two direct current input brushes having different potentials are provided, a set of equi-potential brushes being regarded for this purpose and hereinafter as one brush.

In transmitters of this kind the magnetic field of the transmitter does not maintain a constant angle with respect to the position of the input brushes, and the magnetic field of the receiver accordingly does not maintain an exact constant angular relation with the position corresponding to the position of the magnetic field of the transmitter.

The total angle (known as the angle of lag) between the position of the field of the receiver and the position which it should have in order to correspond exactly with the transmitting field depends inter alia upon the speed of the receiver as can be shown from the theory of alternating currents and its particular application to dynamo electric machines.

According to the present invention two suitably arranged additional input brushes are provided in the transmitter for lag compensation and are preferably arranged at 90 electrical degrees to the usual two brushes. Then the field created in the transmitter consists of two components, the one created by the current supplied through the ordinary set of input brushes, and the other created by the current supplied through the additional brushes. By causing the direct current supplied through the ordinary and additional brushes to depend in a suitable manner on the load and speed of the receiver, the resultant field in the transmitter can be varied in such a way as to compensate the above described lag.

In order that the invention may be clearly understood and readily carried into effect the same will now be described more fully with reference to the accompanying diagrammatic drawings wherein:—

Figure 1:
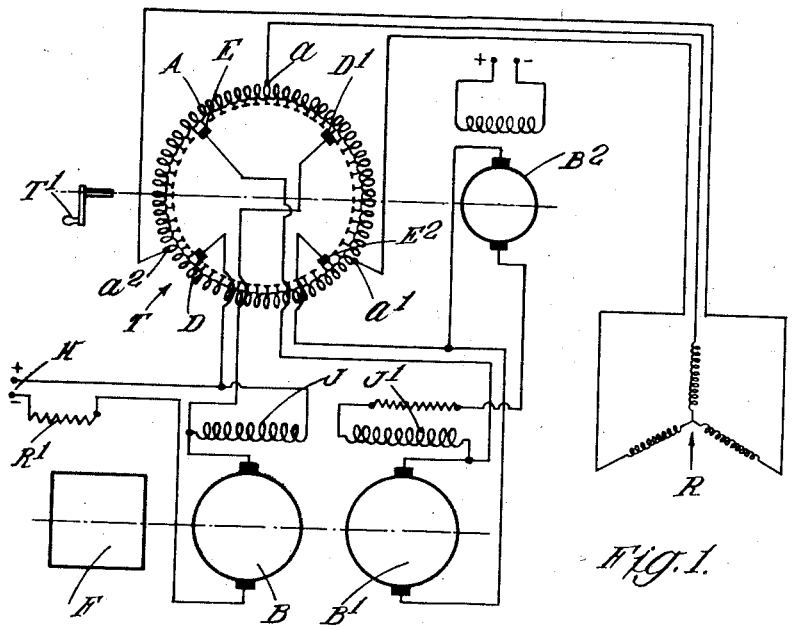
Figure 1 represents an electric distant control system embodying a transmitter provided with two pairs of brushes in accordance with the invention.

In Figure 1, T is the transmitter and R the receiver. The receiver, in this illustration, is a synchronous motor which is represented as a star connected winding. Any other connections used for synchronous motors can be equally well applied. The transmitter T has a stationary armature A with three output terminals $a$, $a^1$, $a^2$, corresponding to the three phase system which is used, in this example, for feeding the receiver. The usual operating handle is indicated at $T^1$. The input direct current to the transmitter is supplied by means of two pairs of brushes D, $D^1$ and E, $E^2$ arranged at opposite ends of two mutually perpendicular straight lines. By way of example, the brushes D, $D^1$ are indicated as being supplied with current, the value of which is independent of the speed of the transmitter, while the brushes E, $E^2$, are supplied with current, the value of which is proportional to this speed. This is effected by means of a motor generator driven by means of a driving motor F and having on the same shaft two direct current generators B, $B^1$, which, owing to the character of their performance, and to the purpose which they serve, are called "boosters". The constant current is supplied to the brushes D, $D^1$, from the main supply H through a resistance $R_1$ and the armature of the booster B. The shunt excitation winding J of the latter is so designed, in accordance with the well known methods, as to produce in the armature of the booster B an E. M. F. equal and opposite to the potential difference between the terminals of this excitation winding, i. e., to the potential difference between the brushes D, $D^1$. Consequently, the current supplied to the brushes D, D¹, will be practically equal to the voltage at the terminals of the main H, divided by the resistance R₁, whatever the potential difference between the brushes D, D¹ may be. The latter must obviously depend on the output current, the value of the current supplied to the brushes E, E² and the speed of the transmitter, and therefore, cannot be expected to remain constant. Thus the booster B plays an essential part in the maintenance of the constancy of the current through the brushes D, D¹.

The current proportional to the speed of the transmitter is supplied to the brushes E, E² from the booster B¹. The excitation winding J¹ of this booster is connected in shunt, but not directly as in the corresponding winding J of the booster B, but through a small auxiliary direct current generator B², which has constant independent excitation, and may be called a "field booster". This machine may be mounted on the same shaft as the transmitter or may be geared to it. The excitation winding J¹ is designed on the same principle as the excitation winding J of the booster B in order to make the booster B¹ compensate the potential difference between the brushes E, E². Therefore, if this winding were connected to the brushes E, E² directly, or the E. M. F. of the field booster B² were equal to zero, there would be no current passing through the brushes E, E². Due to the action of the field booster B², however, this current will be proportional to the speed of the armature of the booster B² and hence proportional also to the speed of the transmitter.

Figure 2:
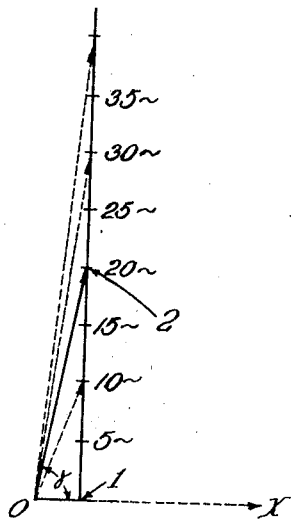
Figure 2 is a vector diagram showing the change of the angle between the applied voltage vector and the magnetic flux vector on the receiver.

In Figure 2, O—1 represents the constant component, 1—2 is the variable component proportional to the frequency, corresponding in the diagram to 20 cycles, and O—2 the total current corresponding to this frequency. This diagram also corresponds, as is well known, to the no-load voltage diagram of a synchronous motor. OX would, in that case, be a direction representing the position of the rotor. Vector O—2 would represent the applied voltage at 20 cycles, and the angle γ would be the angle which the applied voltage leads the flux. If the resistance of the transmitter and the receiver were much greater than their reactance, the position of the vector of the current supplied to the transmitter would practically coincide with that of the vector representing the voltage distribution in the armature of the transmitter. At a certain rate of increase of the current supplied through the brushes E, E² with the frequency, the vector triangles of the transmitter and of the receiver would be similar, and then as is not difficult to see, the direction of the vector corresponding to the no-load position of the rotor, would have a constant angle with the vector representing the position of the brushes D, D¹ at any speed of the transmitter.

Figure 3:
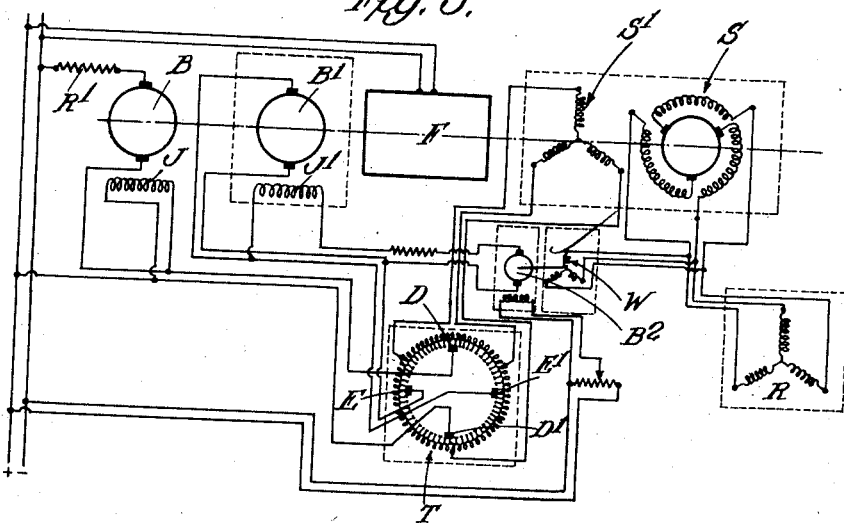
Figure 3 is a circuit diagram of an electric distant control system in which a commutator generator is used for the purpose of power amplification (such a system being described in the specification of English Patent No. 221,041) and in which the transmitter has two pairs of brushes in accordance with the invention.

In the modification illustrated in Figure 3, the receiver is connected to the working windings of the commutator generator. The excitation winding S¹ of the commutator generator is supplied with current by the transmitter T. In such an arrangement, the voltage supplied to the receiver has practically a constant phase angle with the excitation current, i. e., with the current in the excitation winding S¹ of the commutator generator. It would not be difficult to show on the basis of the well known theory of polyphase currents, that the latter current will have a constant phase angle with the current supplied to the transmitter if the ratio of the resistance and self-induction of the armature of the transmitter equals the ratio of the resistance and self-induction of the excitation winding S¹. Consequently, under these conditions, the relationship between the position of the brushes of the transmitter and the position of the rotor of the receiver will be the same as in the case of a direct electrical connection between the transmitter and receiver, as shown on Figure 1. Hence the lag correction will be achieved by the same method of current supply to the transmitter as was described in connection with Figure 1. The only difference between the current supply to the transmitter shown on Figure 1, and in that shown on Figure 3, is that in the latter the supplementary field booster B² is not directly geared to the transmitter, but is driven by a synchronous or induction motor W, fed by the commutator generator S and having, therefore the same speed (or nearly the same speed if the motor W is an induction motor) as the transmitter T.

Figure 4:
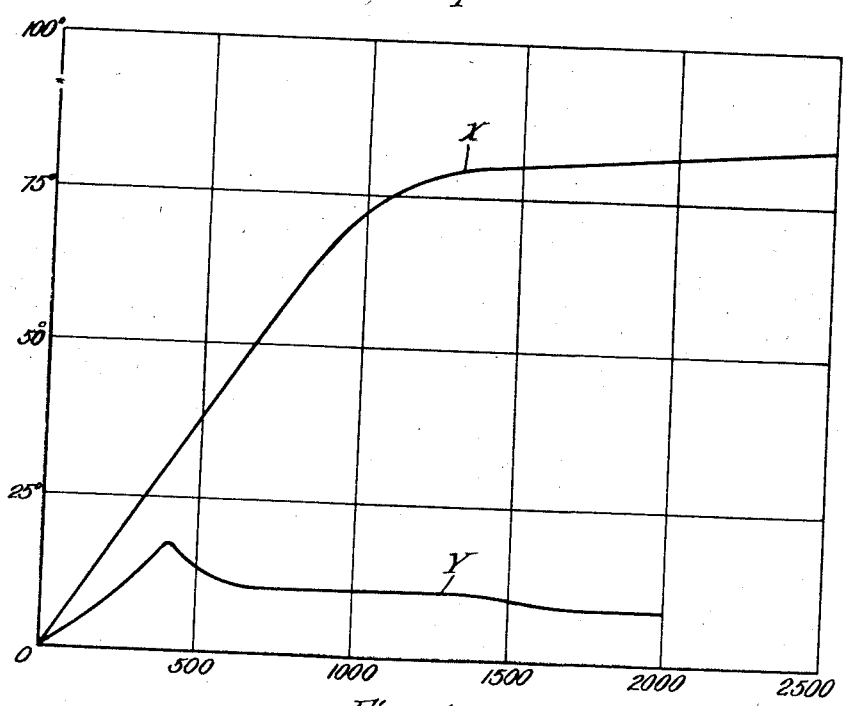
Figure 4 illustrates by graphs the lag correction produced by the invention.

To illustrate the actual use of the present invention for lag correction a typical chart of experimental results is shown on Figure 4, which relates to a system with a commutator generator as shown on Figure 3. 0–2500 represents revolutions per minute and 0–100° represents degrees of lag between the transmitter and receiver at no-load. X is a curve of lag without the correction, and Y is a curve of lag with the correction in accordance with the invention. The small peak in the curve Y is due to the fact that the resistance/self-induction ratios of the armature of the transmitter and of the excitation winding of the commutator generator were not equal.

What I claim and desire to secure by Letters Patent of the United States is:—

1. In an electric transmission system of the type comprising a receiver formed as a polyphase synchronous motor and an electrically connected transmitter having an armature provided with a continuous winding, the latter being energized by a usual D. C. feed component which is cyclically moved around the winding in accordance with mechanical movements imparted to the transmitter to afford polyphase A. C. output of variable frequency from said transmitter, the method of compensating for lag between the transmitter and receiver which comprises feeding to the transmitter armature winding an additional D. C. component which is electrically displaced from said usual feed component with respect to the armature winding, and controlling the said displaced component so that its magnitude varies according to the speed of operation of the transmitter.

2. In an electric transmission system of the type comprising a receiver formed as a polyphase synchronous motor and an electrically connected transmitter having an armature provided with a continuous winding the latter being energized by a usual D. C. feed component which is moved cyclically around the winding in accordance with mechanical movements imparted to the transmitter to afford a polyphase output of variable frequency from said transmitter, the method of compensating for lag between the transmitter and receiver which comprises feeding to the transmitter an additional D. C. component which is displaced by 90 electrical degrees from the usual D. C. component, and controlling the usual and additional current components so that the one is independent of speed of operation of the transmitter whilst the other is dependent in magnitude made upon such speed.

3. In an electric distant control system, a transmitter comprising an armature having a continuous winding, contacts connecting along points of the armature winding, a first pair of brushes working upon said contacts, a second pair of brushes working upon said contacts, means for supplying current independent of the speed of operation of the transmitter to said first pair of brushes, means for supplying current whose magnitude depends upon the speed of actuation of the transmitter to said other pair of brushes, and polyphase output connections from said continuous winding.

4. In an electric distant control system, a transmitter comprising an armature provided with a continuous winding, a plurality of circularly disposed contacts connecting at a series of tapped points upon the winding, a first pair of brushes bearing at opposite points upon the said circularly disposed contacts and angularly movable with respect thereto, a second pair of angularly movable brushes arranged at right angles to said first pair of brushes, polyphase output connections leading from points upon the armature winding, and means for supplying direct current independent of the speed of the transmitter to the said first pair of brushes, and means for supplying direct current in magnitude proportional to the speed of the transmitter to said second pair of brushes.

5. In an electric distant control system, a transmitter comprising an armature provided with a continuous winding, a plurality of circularly disposed contacts connecting at a series of tapped points upon the winding, a first pair of brushes bearing at opposite points upon the said circularly disposed contacts and angularly movable with respect thereto, a second pair of angularly movable brushes arranged at right angles to said first pair of brushes, polyphase output connections leading from points upon the armature winding, a booster arranged to supply a direct current component to said first pair of brushes, said current component being of constant magnitude, and a second booster arranged to have its field controlled according to the speed of actuation of the transmitter so that it supplies a current component of magnitude proportional to the speed of the transmitter.

6. An electric distant control system comprising a transmitter having an armature provided with a continuous winding connected with a plurality of circularly disposed contacts, a first pair of brushes adapted to be rotated around upon said contacts, a second pair of brushes arranged at right angles to said first pair and also adapted to be rotated round upon said contacts, means for actuating the brushes as a whole, means for supplying a direct current component to said first pair of brushes independent of the speed of actuation of the same, means for supplying a direct current component in magnitude proportional to the speed of the brushes to said second pair of brushes, polyphase tappings upon the armature winding of the transmitter, connections from said tappings to the polyphase excitation winding on an A. C. commutator generator, connections from the output of said generator to a polyphase synchronous motor acting as the receiver.

7. An electric distant control system comprising a transmitter having an armature provided with a continuous winding, means for feeding cyclically around said winding a first direct current component in magnitude independent of the speed of actuation of the transmitter, means for feeding cyclically around said winding a second direct current component, said second component being displaced through 90 electrical degrees, with respect to said first component and said displaced current component being in magnitude arranged to be proportional to the speed of actuation of the transmitter, polyphase connections from the transmitter armature winding to the excitation winding of an alternating current commutator generator, a source of constant speed rotation for driving the commutator generator, a first booster for supplying said current component independent of the speed of operation of the transmitter, a second booster for supplying the current component proportional to the speed of the transmitter, mechanical connecting means from said source of rotation to both said boosters, a generator supplying current for influencing the field of said second booster, said generator being driven at a speed proportional to the speed of operation of the transmitter, and a polyphase synchronous motor acting as the receiver and connected to the output of the A. C. commutator generator.

NICHOLAS JAPOLSKY.